United States Patent [19]

Chen

[11] Patent Number: 4,736,408
[45] Date of Patent: Apr. 5, 1988

[54] SAFETY SEAT STAND APPARATUS FOR COIN-OPERATED TELEPHONE SETS

[76] Inventor: Ching S. Chen, No. 364, Ho-Tso St., Taichung City, Taiwan

[21] Appl. No.: 108,420

[22] Filed: Oct. 14, 1987

[51] Int. Cl.⁴ .......................................... H04M 12/02
[52] U.S. Cl. ................... 379/155; 379/146; 379/445
[58] Field of Search ............ 379/145, 146, 147, 445, 379/148, 149, 150, 151, 152, 153, 154, 155

[56] References Cited

U.S. PATENT DOCUMENTS

| | | | |
|---|---|---|---|
| 2,309,572 | 1/1943 | Bruck | 379/155 |
| 2,928,909 | 3/1960 | Allen | 379/455 |
| 3,066,190 | 11/1962 | Hare | 379/153 |
| 3,112,366 | 11/1983 | Gibbs | 379/147 |
| 3,136,858 | 6/1964 | Conviser et al. | 379/145 |
| 3,393,273 | 7/1968 | Bustos | 379/155 |
| 4,323,739 | 4/1982 | Flax et al. | 379/445 |
| 4,451,713 | 5/1984 | Wittes | 379/445 |

Primary Examiner—Robert Lev
Attorney, Agent, or Firm—Nixon & Vanderhye

[57] ABSTRACT

A safety seat stand apparatus for coin-operated telephone sets includes: a stand body with a horizontal portion and a vertical portion having an open receiving chamber formed in the horizontal portion for securing a coin-operated telephone therein; a drawer-type coin box with a first lock device movably provided under horizontal portion in communication with the open receiving chamber; an information panel structure provided on the vertical portion of the stand body for posting various charges and information thereon; and a check member with a second lock device and a press piece closely engaged with the vertical portion of the stand body so as to safely secure the coin-operated telephone set in the open receiving chamber through the second lock device and the press piece; thereby, a coin-operated telephone set combined with the safety seat stand apparatus can be fixed on any solid supporting object for convenient usage.

4 Claims, 2 Drawing Sheets

SAFETY SEAT STAND APPARATUS FOR COIN-OPERATED TELEPHONE SETS

BACKGROUND OF THE INVENTION

This invention relates to a seat stand apparatus for telephone sets, and more particularly to a safety seat stand apparatus for securing a desk-type coin-operated telephone set therein and being fixed on a solid supporting object for convenient usage.

Coin-operated telephones are available in all public areas such as restaurants, hotels, shopping centers, etc. However, these coin-operated telephones are usually designed as desk-type telephones for being movably positioned on a counter or other places without any safety arrangements. As a result, problems encountered with these desk-type coin-operated telephones are: (1) Since there is no safety device provided for the coin-operated telephones, coins accumulated in the coin box thereof often become a pilfering object of filchers. (2) Owing to the fact that the coin box provided within the coin-operated telephones usually occupies only a small space therein, frequent use of the coin-operated telephones often results in an inundation of coins, which obstructs further use of the telephone.

SUMMARY OF THE INVENTION

It is accordingly a primary object of this invention to provide a safety seat stand apparatus for coin-operated telephone sets so as to overcome the problems suffered by the prior art.

This and other objects of this invention are achieved by providing a safety seat stand apparatus for desk-type coin-operated telephone sets, which safety seat stand apparatus comprises: an L-shaped body with a horizontal portion and a vertical portion having an open receiving chamber formed in the horizontal portion for securing a coin-operated telephone set therein; a drawer-type coin box with a frist lock device movably provided under the horizontal portion in communication with the open receiving chamber for storing coins released from the installed coin-operated telephone set; an information panel structure with a plurality of supporting members and a locking piece provided on the vertical portion for posting various charges and the related information thereon; and a check member with a second lock device and a press piece coupled with the vertical portion of the stand body through the locking piece and the press piece for safely securing the coin-operated telephone set in position; thereby, a desk-type coin-operated telephone set secured in the safety seat stand apparatus can be fixed on any solid supporting object for convenient usage.

Other advantages and characteristics of this invention will become apparent from the following detailed description of a preferred embodiment when read in conjunction with the accompanying drawings.

DETAILED DESCRIPTION OF THE PREFERRED EMBODIMENT

Figure 1:
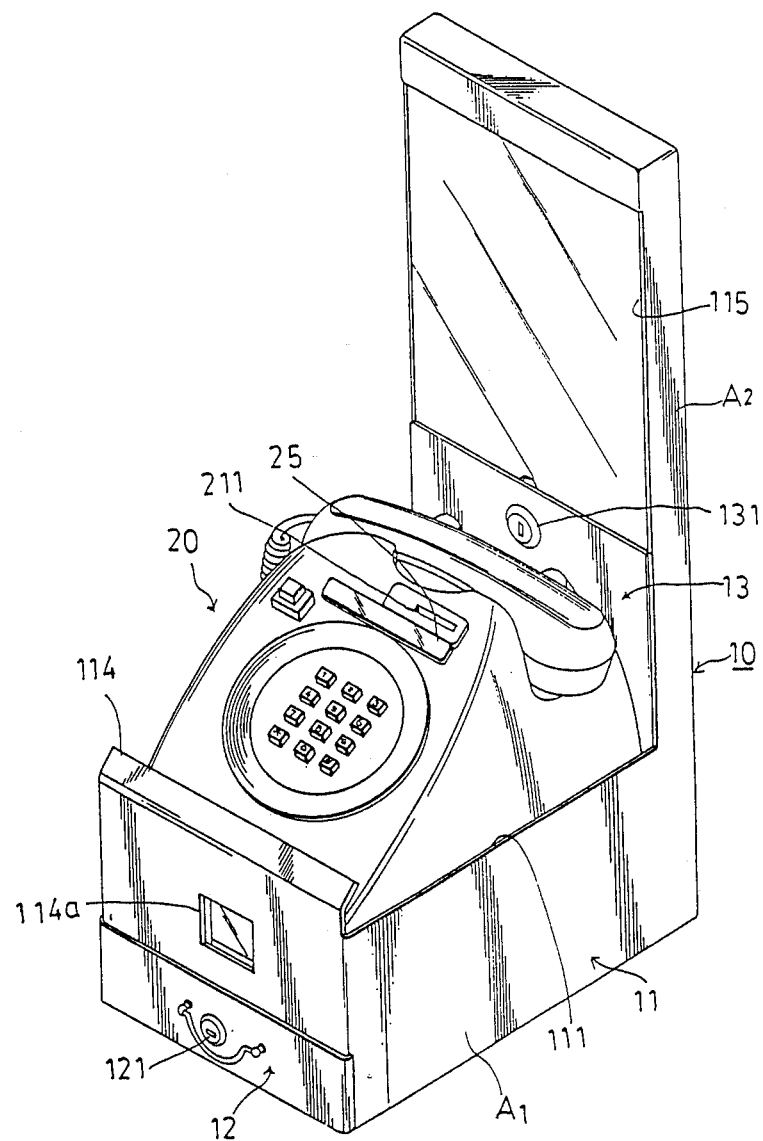
FIG. 1 is an illustrative view of the preferred embodiment of a safety seat stand apparatus with a desk-type coin-operated telephone set secured therein according to this invention.
Figure 2:
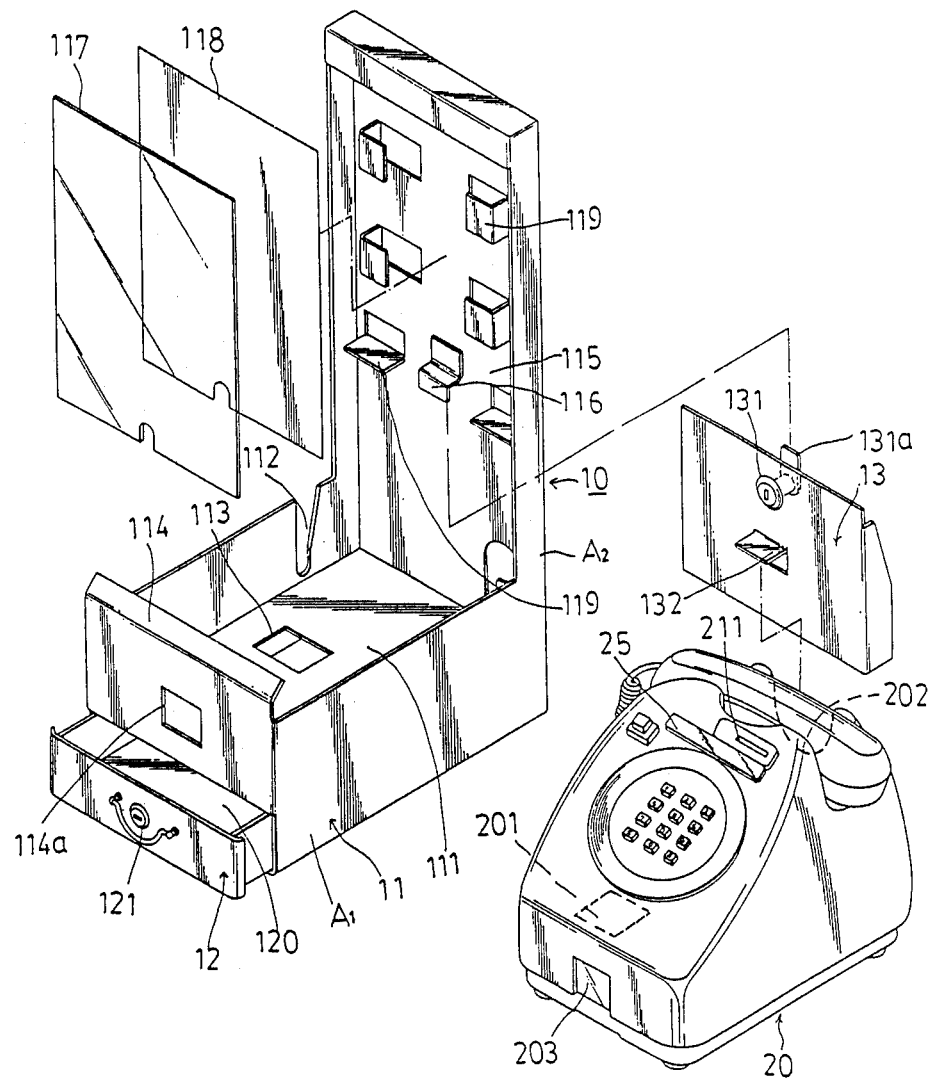
FIG. 2 is an explosive and perspective view of the preferred embodiment of the safety seat stand apparatus for desk-type coin-operated telephone sets shown in FIG. 1.

Referring to FIGS. 1 and 2, the preferred embodiment of a safety seat stand apparatus 10 for desk-type coin-operated telephone sets according to this invention comprises: an L-shaped stand body 11 with a horizontal portion A1 and a vertical portion A2; an open receiving chamber 111 formed in the horizontal portion A1 for accommodating a desk-type coin-operated telephone set 20 therein; a notch 112 formed in a side wall of the receiving chamber for the passing through of the handset electrical cord; a coin dropping opening 113 located in a bottom side of the open receiving chamber 111 for being aligned with the coin releasing opening 201 of the telephone set 20; a coin ejecting opening 114a provided in a front side wall of the open receiving chamber 111 in conjunction with the coin ejecting opening 201 of the telephone set 20; and an inclined retaining flange 114 extending at an upper edge of the front side wall of the open receiving chamber 111 for being closely kept in contact with the front edge of the telephone set 20 so as to prevent the front edge of the latter from being lifted up therefrom; a drawer-type coin box 12 having a first locking device 121 provided therein movably disposed under the bottom side of the open receiving chamber 111 with its open section 120 in communication with the coin dropping opening 113, which is aligned with the coin releasing opening 201 of the telephone set 20; an information panel structure 115 having a plurality of supporting members 119 provided on an upper part and a locking piece 116 in a middle area thereof integrally formed on the vertical portion A2; and a check member 13 having a second lock device 131 and a press piece 132 respectively provided thereon being closely engaged with the lower end of the vertical portion A2 with the latch bolt 131a locked in position behind the locking piece 116 of the information panel structure 115 and the press piece 132 being kept in contact with a level recess 202 of the telephone set 20 so as to secure the latter in safety position within the open receiving chamber 111 in connection with the inclined flange 114.

As can be seen in FIG. 1, having the desk-type coin-operated telephone set 20 disposed in the open receiving chamber 111 of the stand body 11 as described and illustrated hereinbefore, the combined safety seat stand 10 can be conveniently fixed on any solid structure such as table, wall, etc., with reliable safety protections against pilferage and abnormal movement.

Since different areas require different charges for coin-operated telephones, it is necessary to post the required charges and related information on the coinoperated telephone sets. As shown in FIG. 2, an information board 118 with necessary information posted thereon is disposed in the information panel structure 115 against the supporting members 119, and a transparent plate 117 is inserted into the information panel structure 115 over the information board 118 as shown in FIG. 1. Therefore, a list of call charges readily available for the users.

Having thus described the invention, it is to be understood that many embodiments thereof will suggest themselves without departing from the spirit and scope of the ivention. Therefore, it is intended that the specification and drawings be interpreted as illustrative rather than in a limiting sense except as defined in the appending claims.

What is claimed is:

1. A safety seat stand apparatus for coin-operated telephone sets each having a casing body and a handset with a coin releasing opening, a coin ejecting opening and a level recess respectively provided in the casing body, comprising:
   a stand body formed in an L shape with a horizontal portion and a vertical portion adapted for being fixed on a solid supporting object, said horizontal portion including an open receiving chamber for accommodating the casing body and the handset of a coin-operated telephone set, said vertical portion including an information panel structure for posting telephone call charges and related information thereon;
   a coin box formed in a drawer type and having a first lock means installed therein movably disposed under a bottom side of the horizontal portion of said stand body and in communication with said open receiving chamber for storing coins released from the coin-operated telephone set; and
   a check member having a press piece extending on one side closely coupled with the vertical portion at a lower part thereof with the press piece being engaged with the level recess of the coin-operated telephone set for securing the latter in safety position within the open receiving chamber; whereby, a combined safety seat stand can be conveniently fixed on a solid supporting object with reliable safety protections.

2. A safety seat stand apparatus according to claim 1 wherein said open receiving chamber of said stand body further comprises a notch formed at a side wall for allowing an electrical cord of the handset to pass through, a coin dropping opening provided in a bottom side in conjunction with the coin releasing opening of a coin-operated telephone set, and an inclined retaining flange located at an upper edge of a front wall for being closely engaged with a front edge of the coin-operated telephone set so as to prevent the latter from being lifted up upon being positioned in said open receiving chamber.

3. A safety seat stand apparatus according to claim 1 wherein said information panel structure comprises:
   a plurality of supporting members provided on an upper part of the vertical portion of said stand body;
   a locking piece located in a middle area of the vertical portion of said stand body; an information board having call charges and related information posted thereon disposed on the supporting members; and
   a transparent plate inserted in the vertical portion of said stand body over the information board; thereby, different charges and related call information can be displayed for easy reference by the users.

4. A safety seat stand apparatus according to claim 1 wherein said check member further comprises a second lock means provided on an upper part thereof in conjunction with the locking piece of said information panel structure so that when said check member is coupled with the vertical portion of said stand body and closely engaged with the coin-operated telephone set positioned in the open receiving chamber, a latch bolt of the second lock device can be engaged with the locking piece so as to lock said check member in position against the coin-operated telephone set for safety purpose.

* * * * *